No. 701,434. Patented June 3, 1902.
G. A. WEIDELY.
VEHICLE TIRE.
(Application filed Oct. 8, 1901.)
(No Model.)
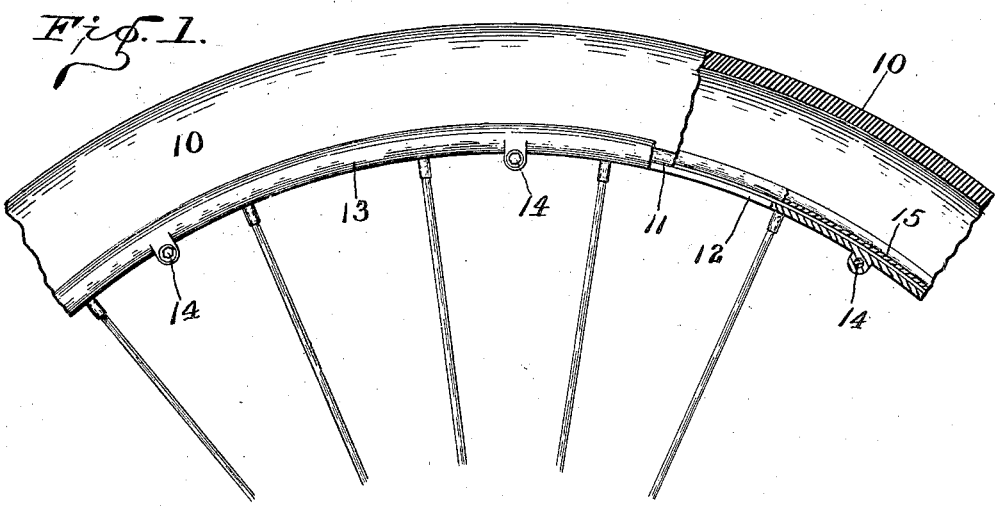
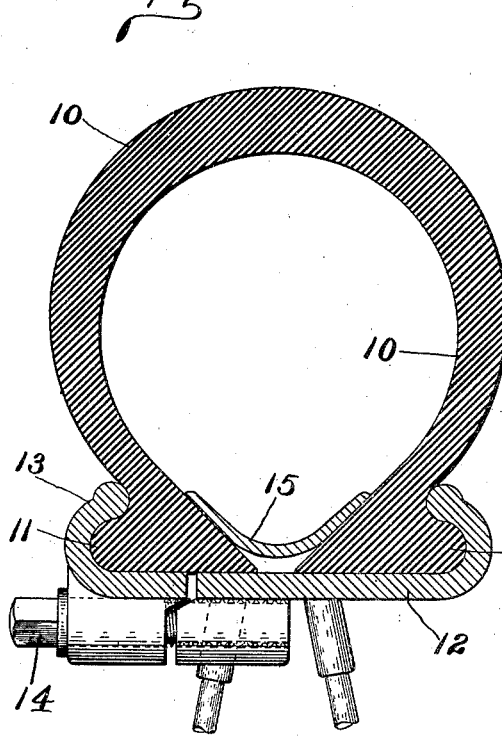
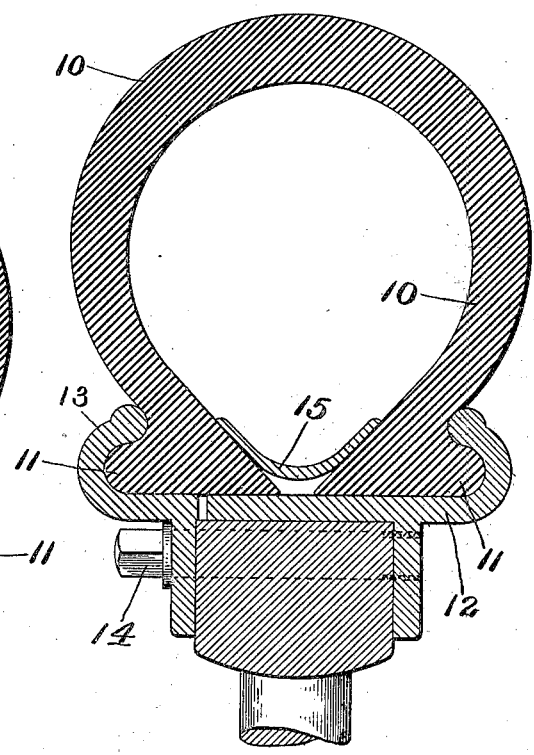
WITNESSES:
C. S. Frye.
J. H. Colvin.
INVENTOR.
George A. Weidely,
BY
Chester Bradford,
ATTORNEY.

UNITED STATES PATENT OFFICE.

GEORGE A. WEIDELY, OF INDIANAPOLIS, INDIANA, ASSIGNOR TO THE G. & J. TIRE COMPANY, OF INDIANAPOLIS, INDIANA, A CORPORATION OF INDIANA.

VEHICLE-TIRE.

SPECIFICATION forming part of Letters Patent No. 701,434, dated June 3, 1902.

Application filed October 8, 1901. Serial No. 77,948. (No model.)

*To all whom it may concern:*

Be it known that I, GEORGE A. WEIDELY, a citizen of the United States, residing at Indianapolis, in the county of Marion and State of Indiana, have invented certain new and useful Improvements in Vehicle-Tires, of which the following is a specification.

The object of my present invention is to provide a means for firmly and securely holding that variety of tires known as "clencher-tires" onto the wheel-rims continuously throughout their lengths; and it consists in the peculiar form, arrangement, and combination of parts hereinafter described and claimed.

Referring to the accompanying drawings, which are made a part hereof and on which similar reference characters indicate similar parts, Figure 1 is a view of a fragment of a vehicle-wheel and its tire embodying my present invention, partially in side elevation and partially in longitudinal section; Fig. 2, a transverse sectional view thereof on an enlarged scale; and Fig. 3, a view similar to Fig. 2, but showing the invention as applied where a somewhat-different construction of the wheel rim or felly is employed.

The tire 10 is of the ordinary and well-known form of clencher-tire, open at the bottom or inner portion and having the usual bead-like ribs 11 at the sides next its open or inner face. The wheel rim or felly is channeled and is formed to fit over and closely embrace the inner portion of the tire, as shown, the curved-over edges extending up over said ribs. Its main portion 12 is stationary and carried by the spokes of the wheel in the ordinary and well-known manner. The other portion 13 is carried by bolts or screws 14, by means of which the parts 13 may be driven inwardly or outwardly toward or from the parts 12, as will be readily understood.

Within the tire 10, bearing upon the inner surface of its smaller side and between the ribs 11, is a band 15, preferably of metal. This serves as a support for the portion of the tire which is within the channel of the rim, and as the rim part 13 is driven inwardly the result is to clamp the tire firmly between the rim and said band, as will be readily understood. This clamping is continuous along the entire length of the tire and rim, and the tire is thus held strongly and rigidly in place. By taking out the bolts or screws 14 the tire may also be easily and quickly removed for purposes of renewal or repair or otherwise. The tires, as will be observed, are held by a strong mechanical clamp and do not depend for adhesion to the rim or felly upon either elasticity or friction caused by inflation of the tire.

Having thus fully described my said invention, what I claim as new, and desire to secure by Letters Patent, is—

1. The combination, in a vehicle-wheel, of a tire open on the under side and having ribs adjacent to the open portion, the inner surfaces opposite said ribs being inclined or tapered, an inner supporting-band formed to rest upon said inclined or tapered surfaces, and a channeled wheel rim or felly composed of two parts adapted to fit over the ribs on the tire, one part being adjustable toward and from the other, whereby the tire may be firmly grasped between the parts of the rim or felly and the inclined surfaces of the inner band, and also conveniently released therefrom.

2. The combination, in a vehicle-wheel, of a tire open on the under side and having annular ribs adjacent to the open portion, a supporting-band adapted to be inserted within the tire just above the open portion, a channeled rim or felly divided into two parts one of which is movable toward and from the other, the movable part being carried by bolts or screws, and said bolts or screws, said several parts being constructed, arranged and operating substantially as shown and described.

In witness whereof I have hereunto set my hand and seal, at Indianapolis, Indiana, this 3d day of October, A. D. 1901.

GEORGE A. WEIDELY. [L. S.]

Witnesses:
CHESTER BRADFORD,
S. H. COLVIN.